United States Patent [19]

Pirl et al.

[11] Patent Number: 5,667,706
[45] Date of Patent: Sep. 16, 1997

[54] APPARATUS AND METHOD FOR LASER WELDING THE INNER SURFACE OF A TUBE

[75] Inventors: William E. Pirl, Penn Twp.; Wesley G. Pope, Port Vue; William G. Cole, Greensburg; Rodney A. Lutz, Penn Township; Frank X. Ponko, Youngwood, all of Pa.

[73] Assignee: Westinghouse Electric Corporation, Pittsburgh, Pa.

[21] Appl. No.: 643,223

[22] Filed: May 3, 1996

[51] Int. Cl.$^6$ .................................................... B23K 26/00
[52] U.S. Cl. ................................. 219/121.64; 219/121.63; 376/260
[58] Field of Search .................... 219/121.63, 121.64; 376/260

[56] References Cited

U.S. PATENT DOCUMENTS

| | | |
|---|---|---|
| 4,538,956 | 9/1985 | Kalkbrenner et al. .................. 414/735 |
| 4,694,136 | 9/1987 | Kasner et al. . |
| 4,694,137 | 9/1987 | Hawkins et al. . |
| 4,839,495 | 6/1989 | Kitera et al. . |
| 4,975,554 | 12/1990 | Tedder . |
| 4,978,834 | 12/1990 | Griffaton . |
| 5,006,268 | 4/1991 | Griffaton ............................ 219/121.63 |
| 5,066,846 | 11/1991 | Pirl .................................... 219/121.63 |
| 5,097,110 | 3/1992 | Hamada et al. ..................... 219/121.63 |
| 5,182,429 | 1/1993 | Pirl et al. ........................... 219/121.63 |
| 5,196,671 | 3/1993 | Kroehmert . |
| 5,252,804 | 10/1993 | Griffaton ............................ 219/121.63 |
| 5,310,982 | 5/1994 | Jusionis . |
| 5,359,172 | 10/1994 | Kozak et al. ....................... 219/121.64 |
| 5,371,767 | 12/1994 | Pirl .................................... 376/260 |
| 5,430,270 | 7/1995 | Findlan et al. ..................... 219/121.63 |
| 5,514,849 | 5/1996 | Findlan et al. ..................... 219/121.63 |

FOREIGN PATENT DOCUMENTS

| | | |
|---|---|---|
| 3-142085 | 6/1991 | Japan ................................. 219/121.64 |
| 94-19141 | 9/1994 | WIPO . |

*Primary Examiner*—Geoffrey S. Evans
*Attorney, Agent, or Firm*—D. G. Maire

[57] ABSTRACT

A laser welding apparatus and method are used to weld the inner surface of small diameter tubes such as nuclear heat exchanger tubes. A weld filler metal carried by a rotatable laser weld head is fed into the weld zone to produce deeply penetrating weldments of low profile. The apparatus and method can effectively be used to repair cracks in heat exchanger tubes to thereby provide extended service life.

25 Claims, 5 Drawing Sheets

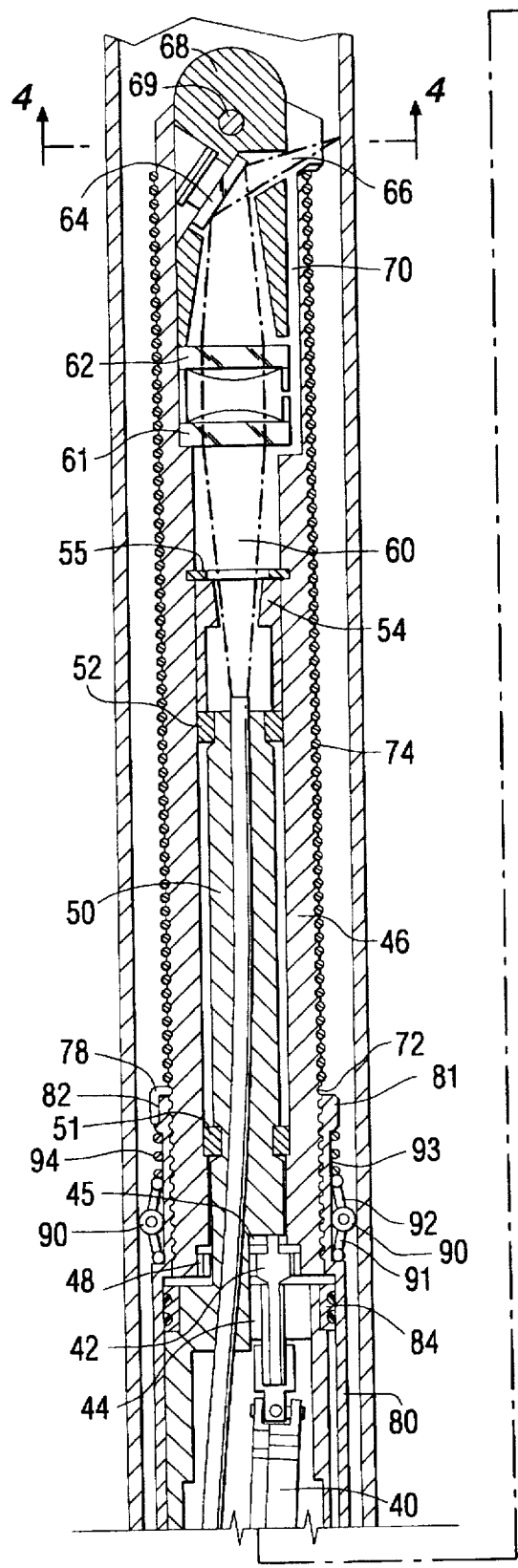
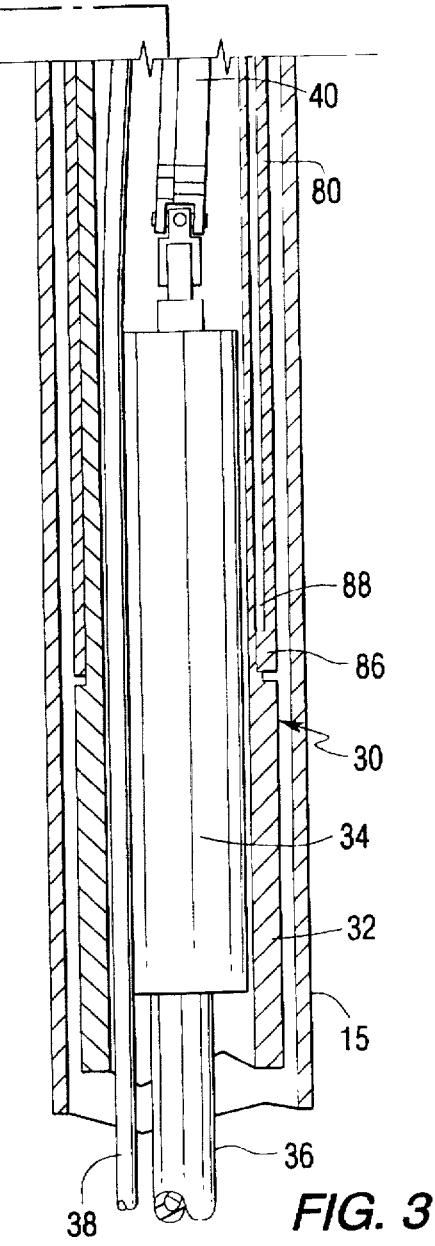
FIG. 3
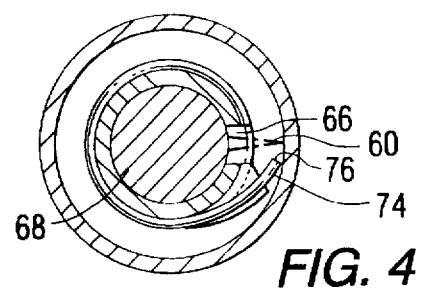
FIG. 4

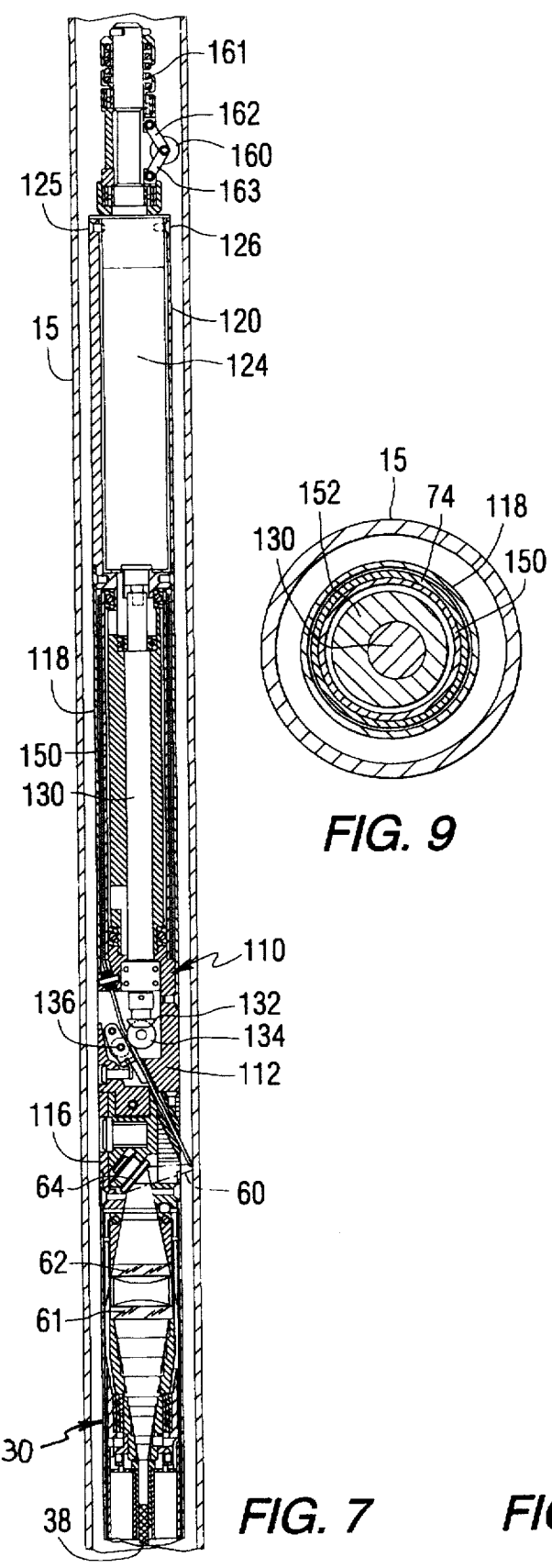
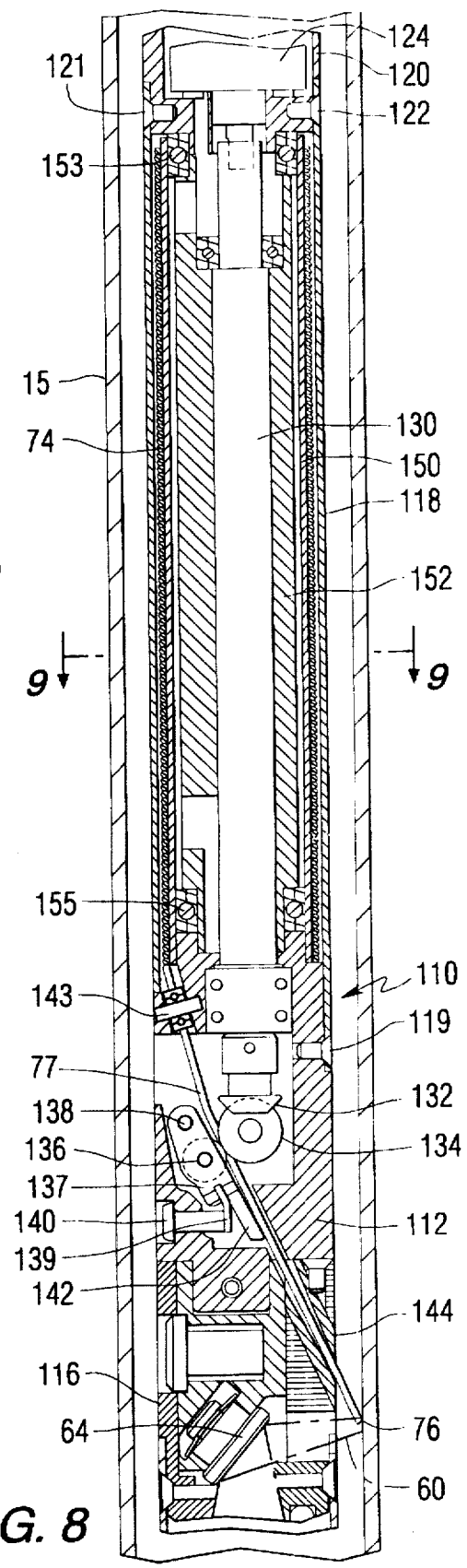

APPARATUS AND METHOD FOR LASER WELDING THE INNER SURFACE OF A TUBE

BACKGROUND OF THE INVENTION

1. Field of the Invention

The present invention relates to welding of the inner surface of tubular members, and more particularly relates to an apparatus and method for laser welding the inner surface of a small diameter tube such as a nuclear heat exchanger heat transfer tube.

2. Background Information

In a conventional nuclear heat exchanger or steam generator, a heated and radioactive primary fluid flows through a plurality of U-shaped tubes, each of the tubes having a fluid inlet and a fluid outlet end. The inlet and outlet ends of the tubes are received through holes in a tube sheet disposed in the heat exchanger for supporting the tubes. The heat exchanger comprises an inlet plenum chamber below the tube sheet, which is in communication with the inlet ends of the tubes. The heat exchanger also includes an outlet plenum chamber below the tube sheet isolated from the inlet plenum chamber and in communication with the outlet ends of the tubes. During operation of the heat exchanger, a heated, radioactive primary fluid flows into the inlet plenum chamber and enters the inlet ends of the tubes. After flowing through the tubes, the primary fluid then flows through the outlet ends of the tubes and into the outlet plenum chamber where the primary fluid exits the heat exchanger. A non-radioactive secondary fluid having a temperature less than the primary fluid surrounds the exterior surfaces of the tubes above the tube sheet as the primary fluid flows through the tubes. As the heated primary fluid flows through the tubes, it gives up its heat to the secondary fluid surrounding the exterior surfaces of the tubes to produce steam that is used to generate electricity in a manner well known in the art.

Because the primary fluid is radioactive, the heat exchanger is designed such that the radioactive primary fluid flowing through the tubes does not commingle with and radioactively contaminate the non-radioactive secondary fluid surrounding the exterior surfaces of the tubes. The tubes are therefore designed to be leak-tight so that the radioactive primary fluid remains separated from the non-radioactive secondary fluid.

However, occasionally, the heat exchanger tubes may degrade and may not remain leak-tight. For example, the tube walls may be degraded by intergranular cracking caused by stress and corrosion occurring during operation of the heat exchanger. The tubes are therefore inspected to detect such stress corrosion cracking or degradation. In conventional heat exchangers, if stress corrosion cracking is detected at a particular location in the wall of the tube, the tube is then "sleeved" at that location. Such sleeving involves the insertion of a tubular metal sleeve into the tube which covers the degraded potion of the tube. The sleeves are typically affixed by expanding the sleeve into intimate engagement with the tube. However, the elastic properties of the metal sleeve may cause the sleeve to experience partial "spring back" after expansion. This phenomenon may cause a relatively small gap to exist at the sleeve-to-tube interface. Such a gap is undesirable because the gap defines a flow pattern between the sleeve and the tube that may allow the radioactive primary fluid to flow through any crack in the tube and commingle with the non-radioactive secondary fluid.

Welding techniques have been developed for fusing the sleeve to the tube by forming, for example, two spaced-apart weldments circumscribing the inner surface of the sleeve in order to seal any gaps between the sleeve and the heat exchanger tube. In particular, laser welding has been used to fuse such a sleeve to the tube.

A system and method for laser welding a tube is disclosed in U.S. Pat. No. 5,182,429 to Pirl et at. The system includes an elongated tubular housing having a rotatable distal potion connected to a non-rotatable proximal potion, a fiber-optic cable for conducting remotely generated laser light into the tubular housing, a beam deflection mechanism supported within the distal potion of the housing and a reflector for radially directing and focusing laser light received from the fiber-optic cable toward the inner wall of the sleeve. In order to weld around the inner wall of the sleeve, the system includes an electric motor within the proximal portion of the tubular housing to rotate the distal portion of the housing and the reflector supported therein.

Another system and method for laser welding a tube is disclosed in U.S. Pat. No. 5,371,767 to Pirl. This patent discloses a system for laser welding a sleeve having a relatively small inner diameter, e.g., 0.313 inch or less.

Additional laser welding systems and methods are disclosed in U.S. Pat. No. 5,006,268 to Griffaton, U.S. Pat. No. 5,066,846 to Pirl, U.S. Pat. No. 5,097,110 to Hamada et at. and U.S. Pat. No. 5,252,804 to Griffaton.

Although sleeving can restore the structural integrity of the heat exchanger tube, it has a number of disadvantages. The sleeve necessarily decreases the internal diameter of the tube passage adding increased pressure drop to the flow of coolant through the tube when the steam generator is placed in service. In addition, if the repair is located in the lower portion of a tube, such as near the tube sheet, subsequent repair of tube degradation above the location of the first sleeve may be prevented because another sleeve of the correct dimensions cannot be inserted past the already inserted sleeve. Furthermore, the welds made at both ends of the sleeve are usually recessed from the end of the sleeve because it is very difficult to accomplish a quality fillet weld on the end of the sleeve. Because these welds are recessed from the ends of the sleeve, a crevice remains between the sleeve and tube in the region between the end of the sleeve and the weld. Also, the area of the sleeve between the welds forms a crevice with the tube. The damage to the tube which necessitated the repair, such as a crack or a pinhole, may allow water to enter the crevice, making the crevice area susceptible to corrosion.

Attempts have been made to use a continuous, autogenous weld inside the tube, without the use of a sleeve, in order to repair damaged heat exchanger tubes. However, such sleeveless repairs can fail because the corrosion which led to the damage produces oxidized surfaces which result in flaws and voids when autogenous welding is used.

The above-noted laser welding systems and methods involve autogenous welding techniques wherein the weldment is formed by melting the metal of the sleeve and/or heat exchanger tube. The sleeve and/or tube thus provide the parent metal for the resultant weldments. While such autogenous weldments are suitable for many applications, a need exists for producing weldments from separately supplied filler metal.

The use of filler material in the welding process can introduce oxidizing and viscosity control agents into the weld zone, thereby preventing flaws and voids associated with autogenous welding. U.S. Pat. No. 5,359,172 to Kozak et al. discloses the use of filler metal for welding the internal surface of a heat exchanger tube.

U.S. Pat. No. 5,430,270 to Findlan et al. also discloses the use of filler metal to build up the internal surface of a heat exchanger tube, wherein a filler metal wire or sleeve is pre-positioned in the tube and a laser weld head is subsequently inserted in the tube. While the apparatus disclosed in U.S. Pat. No. 5,430,270 avoids the use of repair sleeves, it has several disadvantages including displacement and splattering of the weld coil during the welding operation, lack of sufficient penetration of the weld into the wall of the tube, and formation of a large heat affected zone which degrades the microstructure of the tube wall and leads to increased stress corrosion and intergranular cracking of the tube.

Each of the patents listed above is incorporated herein by reference.

It is apparent that improved mitigation techniques are needed to meet the future demands of nuclear power plants. Once the tube plugging margin has been exhausted and a large quantity of sleeves have been installed to permit continued operation of a heat exchanger, tube degradation eventually leads to a decision to replace the steam generator, de-rate the plant or decommission the facility. Alternative repair technology is needed in order to provide extended tube service at an economical cost.

The present invention has been developed in view of the foregoing and to remedy other deficiencies of the prior art.

SUMMARY OF THE INVENTION

According to the present invention, an apparatus is provided for laser welding the inner surface of small diameter tubes using a weld filler metal that is fed into the weld zone. The weld filler metal is provided in the form of a wire that is carried by the laser welding apparatus. Weldments produced with the present apparatus and method comprise a mixture of the tube metal and filler metal which penetrates relatively deeply into the wall of the tube, while extending a limited distance from the inner surface into the interior of the tube. The weldments effectively repair cracks in the tubes and possess a low profile which does not significantly restrict flow through the repaired tubes.

An object of the present invention is to provide a novel apparatus and method for laser welding the inner surface of small diameter tubes such as nuclear heat exchanger tubes.

Another object of the present invention is to provide an improved apparatus for laser welding the inner surface of a tube, including a laser weld head for rotatingly projecting a laser beam against the inner surface of the tube to form a weld zone, a weld filler wire mounted on the laser weld head, and a feed mechanism for feeding the weld filler wire from the weld head to the weld zone.

Another object of the present invention is to provide a method of welding the inner surface of the tube, comprising the steps of providing a laser weld head, mounting a weld filler wire on the laser weld head, inserting the laser weld head and weld filler wire into the tube, rotatingly projecting a laser beam from the laser weld head against the inner surface of the tube to form a weld zone, and feeding the weld filler wire to the weld zone to form a weldment.

A further object of the present invention is to provide an apparatus for welding the inner surface of a heat exchange tube which is capable of passing through a previously sleeved portion of the tube in order to make repairs above the sleeved tube.

These and other objects of the present invention will become more readily apparent from the following description.

BRIEF DESCRIPTION OF THE DRAWINGS

FIG. 3 is a longitudinal section view of a rotatable laser weld head and weld wire feed apparatus of FIG. 2 disposed within a heat exchanger tube.

FIG. 4 is a view taken along section 4—4 of FIG. 3.

FIG. 7 is a longitudinal section view of a rotatable laser weld head and weld wire feed apparatus disposed in a heat exchanger tube in accordance with another embodiment of the present invention.

FIG. 8 is a longitudinal section view of the weld wire feed apparatus of FIG. 7.

FIG. 9 is a cross-sectional view taken along section 9—9 of FIG. 8.

DESCRIPTION OF THE PREFERRED EMBODIMENTS

Figure 1:
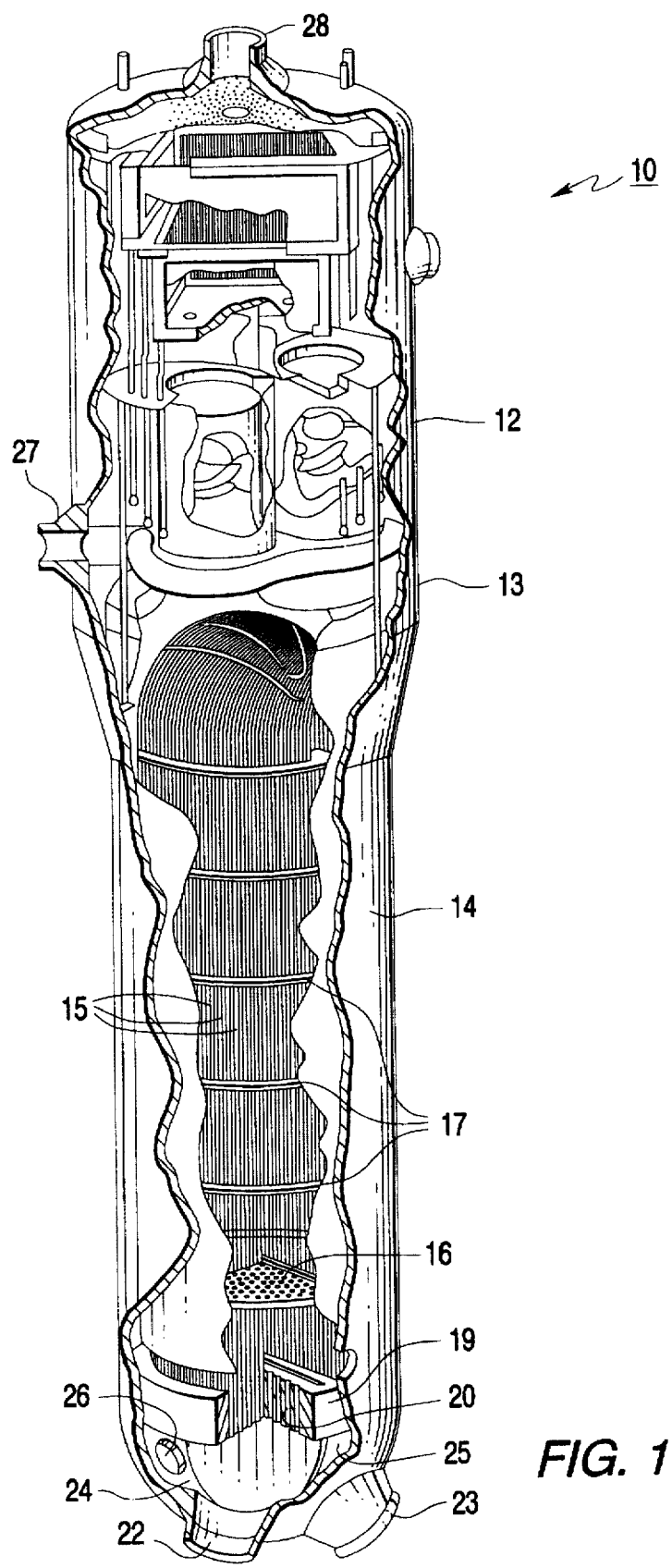
FIG. 1 is a partial elevation perspective view showing a typical nuclear heat exchanger having a plurality of U-shaped heat exchanger tubes disposed therein.

Referring to the figures, wherein like reference numbers represent like elements throughout the drawings, FIG. 1 illustrates a typical nuclear heat exchanger or steam generator 10 for generating steam. The heat exchanger 10 includes a shell 12 having an upper portion 13 and a lower portion 14. A plurality of vertically oriented and inverted U-shaped heat transfer tribes 15 are disposed in the lower portion 14 for circulating heated and radioactive primary fluid therethrough. Each tube 15 extends through a respective hole 16 formed in a plurality of spaced-apart support plates 17 for laterally supporting the tubes 15. Each tube 15 may have a relatively small inside surface or inside diameter which, for example, may be ⅞ inch, ¾ inch, ¹¹⁄₁₆ inch, ⁵⁄₁₆ inch or smaller. As used herein, the term "small-diameter tube" means tubes having a small inside diameter of about 2 inches or less, and includes metal heat exchanger tubes having the above-noted inside diameters.

As shown in FIG. 1, a tube sheet 19 is disposed in the lower portion 14 having a plurality of apertures 20 for receiving open end portions of the tubes 15. A first inlet nozzle 22 and a first outlet nozzle 23 are disposed on the shell 12 in fluid communication with an inlet plenum chamber 24 and an outlet plenum chamber 25, respectively. A plurality of access openings 26, only one of which is shown in FIG. 1, are formed through the shell 12 below the tube sheet 20 for providing access to either the inlet plenum chamber 24 or the outlet plenum chamber 25. A second inlet nozzle 27 is provided through the shell 12 for allowing entry of a non-radioactive secondary fluid into the upper portion 13. A second outlet nozzle 28 is attached to the top of the upper portion 13 for exit of the steam from the heat exchanger 10.

During operation of the heat exchanger 10, the radioactive primary fluid, heated by a nuclear heat source (not shown), flows through the first inlet nozzle 22, into the inlet plenum chamber 24 and through the tubes 15 to the outlet plenum chamber 25 where the primary fluid exits the heat exchanger 10 through the first outlet nozzle 23. As the primary fluid enters the inlet plenum chamber 24, the secondary fluid simultaneously enters the second inlet nozzle 27 and flows into the upper portion 13 to eventually surround the tubes 15. A portion of the secondary fluid vaporizes into steam due to conductive heat transfer from the primary fluid to the secondary fluid through the walls of the tubes 15. The steam exits the heat exchanger 10 through the second outlet nozzle 28 and is piped to a turbine generator (not shown) to generate electricity in a manner known in the art.

Due to tube wall intergranular cracking or degradation caused by stress and corrosion, some of the small diameter tubes 15 may exhibit substantial cracking and, if not identified in time, may not remain leak-tight. Conventional non-destructive evaluation techniques are periodically used to evaluate the integrity of the tubes 15 in order to determine whether substantial cracking has occurred. In accordance with conventional operating procedures, if a crack extends through at least 40% of the tube wall thickness, the tube will require repair. As disclosed more fully below, the apparatus and method of the present invention is capable of suitably repairing such tube wall cracks by means of laser welding using a weld filler metal that is fed into the laser weld zone.

FIGS. 2–6 illustrate various aspects of a laser welding apparatus in accordance with an embodiment of the present invention. As shown most clearly in FIGS. 2 and 3, a weld assembly 30 is adapted for insertion into a heat exchanger tube 15. The weld assembly 30 includes a housing 32 containing a motor assembly 34. The motor assembly 34 includes a conventional, small-diameter motor and encoder powered by an electrical supply line 36. A fiber-optic line 38 extends into the housing 32 for carrying a laser beam through the housing toward the weld zone, as more fully described below. The motor assembly 34 drives a universal joint assembly 40 which, in turn, drives a pinion gear 42. Pinion gear bearings 44 and 45 are used to retain and align the pinion gear 42.

As shown most clearly in FIG. 3, a rotatable weld head shaft 46 is in driving engagement with the pinion 42 by means of an internal gear 48. The rotatable weld head shaft 46 forms a spool for a weld wire, as more fully described below. A fiber-optic ferrule 50, which serves to retain the fiber-optic line 38 within the rotatable weld head shaft 46, extends from the end of the housing 32 into the weld head shaft 46. The ferrule 50 includes bearings 51 and 52 which facilitate rotation of the weld head shaft 46 with respect to the ferrule 50. A locking collar 54 and retainer ring 55 are used to secure the ferrule 50 and fiber-optic line 38 at the appropriate location within the weld head shaft 46.

During operation of the weld assembly 30, a laser beam 60 exits the fiber-optic line 38, travels through lenses 61 and 62 and is reflected from the surface of a mirror 64 through a laser beam port 66 against the interior wall of the heat exchanger tube 15. A mirror retainer 68 is used to support and align the mirror 64 within the weld head shaft 46. A fastener 69 such as a bolt is used to secure the mirror retainer 68 to the weld head shaft 46. As shown in FIG. 3, the mirror 64 is preferably adjusted to an angle which reflects the laser beam 60 toward the interior wall of the heat exchanger tube 15 at a non-orthogonal angle. The use of such a non-orthogonal laser beam angle has been found to reduce back-splatter of molten metal onto the mirror 64 during the welding operation. The laser beam angle, as measured from a line drawn perpendicular to the rotation axis of the weld assembly, preferably ranges from about 1 to about 45 degrees, and more preferably ranges from about 8 to about 12 degrees. An angle of 10 degrees is particularly suitable.

In accordance with conventional welding techniques, a shield gas is preferably introduced into the welding area during the welding operation. Thus, the weld assembly 30 of the present invention may be provided with means for supplying a shield gas to the weld area, including a gas port 70 extending through the weld head shaft 46 towards the laser beam port 66. A shield gas such as argon may therefore be supplied through the housing 32 to the gas port 70 by suitable conduits.

In accordance with the embodiment shown in FIGS. 2–6, the weld head shaft 46 includes a contoured outer surface defined by a spiral groove 72. The spiral groove 72 receives a preformed weld filler wire 74, which is generally coil-shaped. The weld head shaft 46 and its spiral groove 72 thus act as a spool to carry the weld filler wire 74. The preformed weld filler wire 74 comprises a weld end 76 which is fed into the laser weld zone during the welding operation. The other end of the preformed weld wire 74 comprises a bent tab 78 which substantially prevents the preformed weld wire 74 from rotating with the weld head shaft 46, as more fully described below.

The weld filler wire 74 typically has a circular cross section of suitable diameter, but may alternatively have a non-circular cross section. The composition of the weld filler wire 74 is selected to be compatible with a variety of alloy compositions of the different tubes being welded. For example, heat exchanger tubes of INCONEL 600 composition may be welded with a weld filler metal of EN72 nickel chrome alloy.

Figure 2:
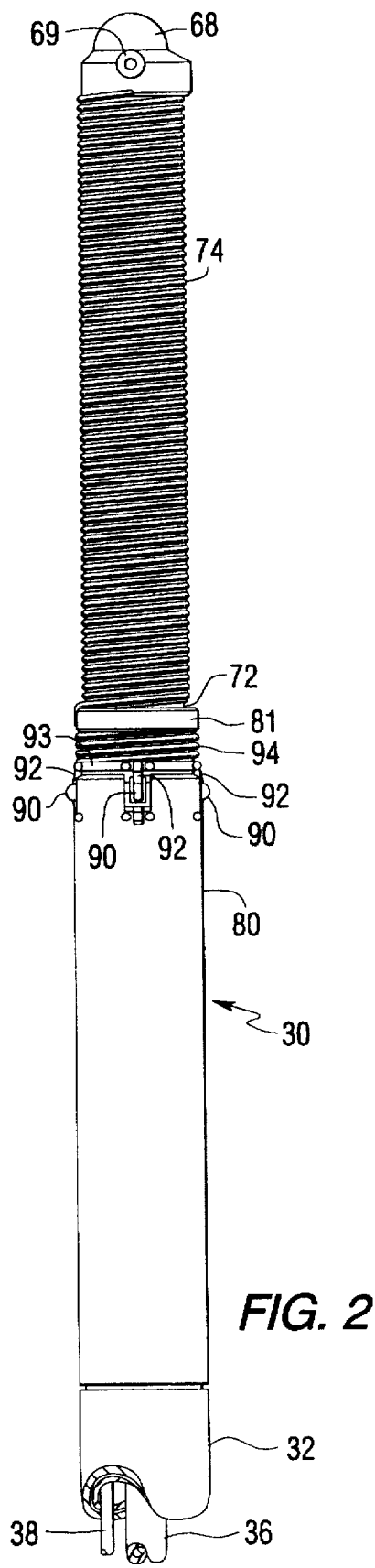
FIG. 2 is an elevation view of a rotatable laser weld head and weld wire feed apparatus in accordance with an embodiment of the present invention.
Figure 6:
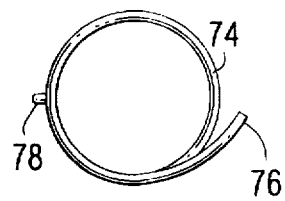
FIG. 6 is a plan view of the coiled weld filler wire of FIG. 5.
Figure 5:
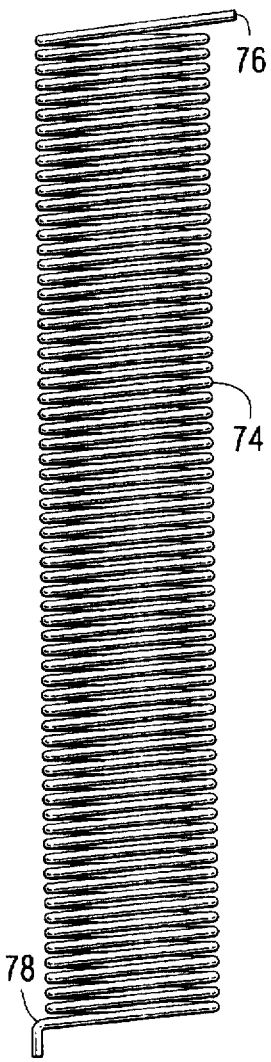
FIG. 5 is an elevation view of a coiled weld filler wire for mounting on a rotatable laser weld head and weld wire feed apparatus as shown in FIGS. 2–4.

The weld assembly 30 shown in FIGS. 2 and 3 comprises an extendable sleeve 80 which can move axially with respect to the weld head shaft 46, but which is prevented from rotating therewith. The extendable sleeve 80 includes an end portion 81 having a retaining groove 82 therein. The retaining groove 82 receives the bent tab 78 of the preformed weld filler wire 74. The engagement of the bent tab 78 within the retaining groove 82 of the extendable sleeve 80 prevents rotation of the preformed weld filler wire 74 in relation to the weld head shaft 46 during the welding operation. The extendable sleeve 80 is preferably sealed gas-tight against the housing 32 by means of a dual O-ring seal 84. The seal 84 substantially prevents the shield gas from escaping between the housing 32 and the extendable sleeve 80. A key 86 is provided at one end of the extendable sleeve 80. The key 86 is slidably received within a groove 88 in the housing 32 which extends in the axial direction along the outside of the housing 32. The engagement of the key 86 within the groove 88 prevents relative rotation of the extendable sleeve 80 with respect to the housing 32.

In order to properly align the weld assembly 30 within the heat exchanger tube 15, a plurality of centering wheels 90 are provided around the circumference of the extendable housing 80. A first rotatable arm 91 connects each centering wheel 90 to the extendable sleeve 80. A second rotatable arm 92 connects each centering wheel 90 to an alignment ring 93. A compression spring 94 presses against the end portion 81 of the extendable sleeve 80 and against the alignment ring 93 to thereby force the centering wheels 90 radially outward toward the interior wall of the heat exchanger tube 15. In this manner, the weld assembly 30 may be centrally aligned inside the heat exchanger tube 15.

During operation of the weld assembly 30 shown in FIGS. 2 and 3, actuation of the motor assembly 34 drives the pinion gear 42 to thereby rotate the weld head shaft 46 through engagement with the internal gear 48. The housing 32, ferrule 50 and fiber-optic line 38 do not rotate with respect to the heat exchanger tube 15. However, the weld head shaft 46 and the mirror 64 rotate within the tube 15 to thereby to direct the reflected laser beam 60 around the interior surface of the heat exchanger tube 15.

The preformed weld filler wire 74, which is substantially prevented from rotating through the engagement of the bent tab 78 within the retaining groove 82 of the extendable sleeve 80, is introduced into the weld zone as the reflected laser beam travels around the interior circumference of the heat exchanger tube 15. As the weld head shaft 46 rotates, the end ting 81 of the extendable sleeve 80 travels within the spiral groove 72 of the weld head shaft to thereby force the extendable sleeve 80 to move axially with respect to the weld head shaft 46 and housing 32. The extendable sleeve 80 thus moves axially along with the preformed weld wire 74, while preventing rotation of the preformed weld wire with respect to the heat exchanger tube 15. In this manner, upon rotation of the weld head shaft 46, the weld end 76 of the preformed weld filler wire 74 is fed into the weld zone in the appropriate position for welding by the reflected laser beam.

FIGS. 7–9 illustrate various aspects of a laser welding apparatus in accordance with another embodiment of the present invention. In this embodiment, the weld assembly 30 is configured similar to the embodiment shown in FIGS. 2–6 and comprises fiber-optic line 38, lens 61 and 62, and rotatable mirror 64. However, in the embodiment of FIGS. 7–9; the weld filler wire 74 is mounted on an independent wire feed assembly 110. The independent wire feed assembly 110 includes a housing 112 connected to a rotatable weld head shaft 116 for rotation therewith. The wire feed housing 112 may be connected to the rotatable weld head shaft 116 by any suitable means such as screws or bolts. A generally cylindrical protective cover 118 is connected at its lower end to the wire feed housing 112 by suitable means such as a fastener 119. The upper end of the protective cover 118 is fastened to a motor casing 120 by fasteners 121 and 122.

A motor assembly 124 is disposed within the motor casing 120 by fasteners 125 and 126. The motor assembly 124 drives a drive shaft 130 having a bevel gear 132 at the lower end thereof. The bevel gear 132 drivingly engages another bevel gear 134 which is rotatably mounted on the wire feed housing 112. A pinch roller 136 is mounted adjacent to the shaft of the bevel gear 134 with sufficient clearance to frictionally engage a feed portion 77 of the weld filler wire 74 therebetween. The pinch roller 136 is mounted inside the wire feed housing 112 by means of a roller support 137 mounted to the housing 112 by means of a pivot pin 138. A bracket 139 extends from a lower portion of the roller support 137 and contacts an adjustment screw 140. Rotation of the adjustment screw 140 causes rotation of the roller support 137 about the pivot pin 138, thereby adjusting the distance between the pinch roller 136 and the shaft of the bevel gear 134. In this manner, the frictional force applied to the feed portion 77 of the weld filler wire 74 can be adjusted. In addition, different weld wire thicknesses can be accommodated. A guide arm 142 of the roller support 137 helps direct the weld filler wire 74 through a conduit 144, from which the weld end 76 of the weld filler wire 74 exits the wire feed housing 112.

The weld filler wire 74 is coiled around a rotatable spool 150, which is rotatably mounted on an inner sleeve 152 of the housing 112 by means of bearings 153 and 155. The rotatable spool 150 can therefore rotate independently of the inner sleeve 152, wire feed housing 112 and protective cover 118.

In order to align the wire feed housing 112 in the center of the tube 15, a series of three centering wheels 160 (only one of which is shown in FIG. 7) are provided at the upper end adjacent to the motor assembly 124. Each centering wheel 160 is biased outwardly toward the inner surface of the tube 15 by a spring 161 and pivoting arms 162 and 163. The centering wheels 160 are placed around the circumference of the assembly at 120° intervals to align the wire feed housing 112 in the center of the tube 15.

During operation of the apparatus shown in FIGS. 7–9, the wire feed housing 112 rotates with the rotatable weld head shaft 116 and mirror 64. Upon actuation of the motor assembly 124, the weld filler wire 74 can be fed into the weld zone created by the reflected rotating laser beam 60. Actuation of the motor assembly 124 causes rotation of the drive shaft 130 and bevel gear 132, which causes rotation of the bevel gear 134. The feed portion 77 of the weld filler wire 74 is advanced by engagement with the shaft of the bevel gear 134 and the pinch roller 136. Actuation of the motor assembly 124 therefore causes the weld filler wire 74 to be fed from the rotatable spool 150 through the sleeve 143 and the conduit 144 to the exterior of the wire feed housing 112.

Since the motor assembly 124 is preferably actuated independently of the rotatable weld head shaft 116, the weld filler wire 74 can be fed into the weld zone in a controlled manner independently of the rotation of the weld head shaft 116 and mirror 64. For example, when starting a welding operation, the rotatable weld head shaft 116 may be rotated by a motor assembly (not shown) similar to the motor assembly 34 illustrated in FIGS. 2 and 3. In a preferred embodiment, rotation of the weld head shaft 116 causes the laser beam 60 to travel around the inner circumference of the tube 15 to thereby preheat a localized portion of the tube. The rate of travel of the laser beam is preferably selected such that the tube wall is not melted during the pre-heating step. Once the tube is preheated, the weld end 76 of the weld filler wire 74 may be fed into the weld zone to melt the filler wire and form a weldment comprising a mixture of the tube and weld filler metals. In accordance with a preferred embodiment, the weld end 76 of the weld filler wire 74 is fed into the weld zone such that melting of the filler wire is accomplished partially by contact with the molten weld pool and partially by direct contact with the laser beam 60.

The following examples are intended to illustrate various aspects of the present invention, and are not intended to limit the scope thereof.

EXAMPLE

A heat exchanger tube is welded with a weld filler metal by the following process. An INCONEL 600 heat exchanger tube having an outer diameter of 0.875 inch and a 0.05 inch thick wall is preheated using a laser beam weld head similar to that shown in FIG. 7. A pulsed ND-YAG laser set at 390 watts is projected against the inner surface of the tube using a revolution speed of 9 rpm and an axial speed of 0.18 inch per minute. At the end of three revolutions, the axial direction of the laser head is switched and the weld wire feed is turned on. During the welding operation, the laser is set at 40 Hz and 4.5 milliseconds. The weld wire is composed of EN72 nickel chrome alloy having a thickness of 0.025 inch. The weld wire is fed into the weld zone at a rate of 7 inches per minute to create a 0.02 inch buildup on the inner diameter of the tube wall, with a 60 to 80 percent penetration of the weldment into the tube wall. The welding operation takes approximately 5.5 minutes to complete and produces a weldment 1 inch long. The resultant weldment is similar to that shown in FIGS. 10 and 11.

Figure 10:
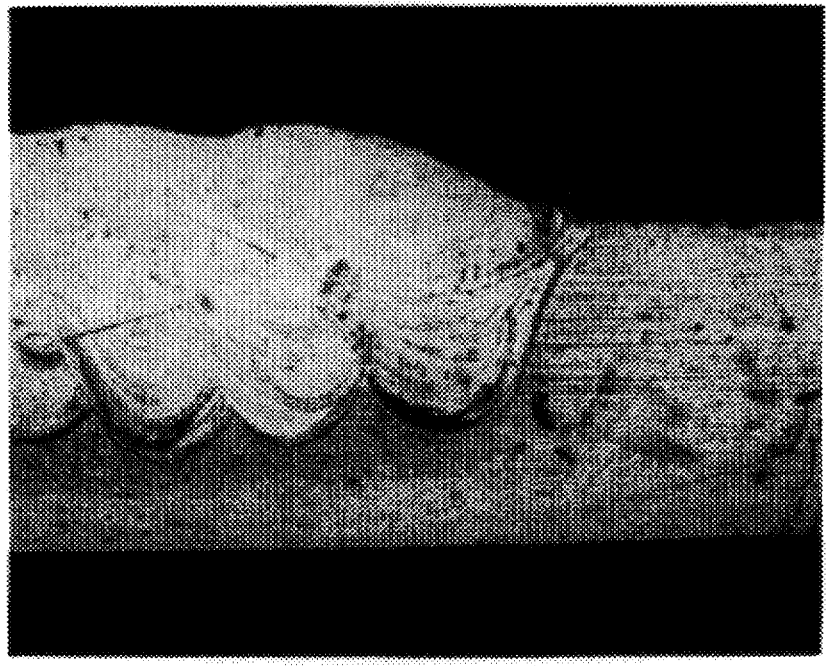
FIG. 10 is a photomicrograph showing a longitudinal section of a heat exchanger tube that has been welded with a filler metal weld wire in accordance with the present invention.
Figure 11:
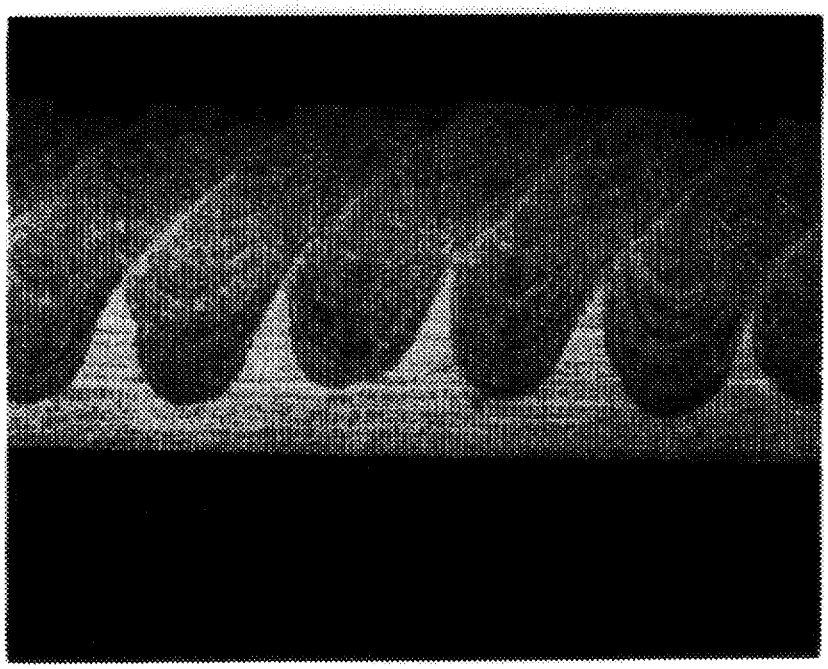
FIG. 11 is a photomicrograph showing another longitudinal section of a heat exchanger tube that has been welded with a filler metal weld wire in accordance with the present invention.

FIGS. 10 and 11 are photomicrographs showing weldments made in accordance with the present invention. In each case, the weldments penetrate deeply into the side wall of the heat exchanger tube. Furthermore, the weldments extend only a limited distance from the inner surface into the interior passageway of the tube. In accordance with the present invention, the weldments preferably penetrate at least about 50% of the distance through the tube wall, and more preferably penetrate from about 60 to about 80% into the tube wall. Thus, for example, a crack extending 40% of the distance from the inner surface into the tube wall will be completely eliminated and repaired by the weldments made in accordance with the present invention. The relatively deeply penetrating weldments of the present invention provide improvements over clad-welding techniques as disclosed in U.S. Pat. No. 5,430,270, cited previously, because such clad-welding techniques essentially form an overlay of welded material on the inner surface of the tube, without significant penetration of the weldment into the tube wall, e.g., 30% penetration or less. Therefore, a crack extending 40% of the distance into a tube wall will not be completely repaired by such clad-welding techniques.

In accordance with a preferred embodiment of the present invention, relatively deep weldment penetration is achieved through the use of a pulsed laser operating at an average power of less than about 500 watts. For example, a ND-YAG pulsed laser operating at 400 watts has been found to achieve the required amount of weldment penetration without producing a large heat affected zone in the metal of the tube adjacent to the weldment. By using a pulsed laser which rotates around the inner surface of the tube, a short burst of laser energy is localized over a discrete area of the tube surface. In contrast; laser welding techniques as disclosed in U.S. Pat. No. 5,430,270 which use a high-powered continuous wave laser, e.g., 1,000 watts, have been found to overheat the metal of the heat exchanger tubes, resulting in a large heat affected zone which destroys the microstructure of the tube and results in increased stress corrosion and intergranular cracking. Furthermore, the use of high-powered continuous wave lasers has been found to produce insufficient weldment penetration, e.g., less than 30% penetration into the tube wall.

As shown in FIGS. 10 and 11, weldments produced in accordance with the present invention preferably extend only a short distance from the inner surface of the tube into the interior passageway thereof. The weldments preferably extend less than about 0.03 inch from the inner surface of the tube, and more preferably extend about 0.02 inch from the inner surface of the tube. This is in contrast with prior art sleeving methods in which the sleeve typically extends 0.05 inch or more from the inner surface of the tube toward the interior thereof. Weldments made in accordance with the present invention thus have a low profile which provides less flow restriction during operation of the heat exchanger tubes, and which may also allow for multiple repairs along ascending portions of a heat exchanger tube. In addition, as shown in FIGS. 10 and 11, weldments made in accordance with the present invention have a smooth surface which allows them to be inspected by non-destructive evaluation techniques such as ultrasonic and eddy current evaluation methods.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention, as set forth by the appended claims.

What is claimed is:

1. Apparatus for laser welding an inner surface of a small-diameter tube comprising:
    laser weld head means operable to be inserted into the tube for rotatingly projecting a laser beam against the inner surface of the tube to form a weld zone;
    means for mounting a weld filler wire on the laser weld head means prior to insertion of the laser weld head means into the tube; and
    means for feeding the weld filler wire from the weld filler wire mounting means to the weld zone.

2. The apparatus of claim 1, wherein the laser beam is pulsed and operates at an average power level of less than about 500 watts.

3. The apparatus of claim 1, wherein the weld filler wire mounting means comprises a rotatable spool.

4. The apparatus of claim 3, wherein the means for rotatingly projecting the laser beam comprises a rotatable mirror and the rotatable spool rotates with the rotatable mirror.

5. The apparatus of claim 4, wherein the weld filler wire feed means comprises means for feeding the weld filler wire to the weld zone upon rotation of the rotatable spool.

6. The apparatus of claim 5, wherein the weld filler wire mounting means comprises means for securing the weld filler wire against rotation with the rotatable spool.

7. The apparatus of claim 3, wherein the means for rotatingly projecting the laser beam comprises a rotatable mirror and the weld filler wire feed means comprises means for feeding the weld filler wire to the weld zone independently of the rotation of the rotatable mirror.

8. The apparatus of claim 7, wherein the weld filler wire feed means comprises a motor assembly mounted for rotation with the rotatable mirror and drive means for feeding the weld filler wire to the weld zone independently of the rotation of the rotatable mirror and motor assembly.

9. The apparatus of claim 1, wherein the weld filler wire mounting means comprises means for preventing contact between the weld filler wire and the inner surface of the tube prior to feeding the weld filler wire to the weld zone.

10. The apparatus of claim 1, wherein the weld filler wire feed means comprises means for feeding the weld filler wire to the weld zone independently of the rotation of the laser beam.

11. A method of welding an inner surface of a small-diameter tube comprising:
    providing a laser weld head;
    mounting a weld filler wire on the laser weld head prior to insertion of the laser weld head into a tube to be welded;
    inserting the laser weld head and weld filler wire mounted on the laser weld head into the tube;
    rotatingly projecting a laser beam from the laser weld head against the inner surface of the tube to form a weld zone; and
    feeding the weld filler wire to the weld zone to form a weldment.

12. The method of claim 11, further comprising providing means for preventing contact between the weld filler wire and the inner surface of the tube prior to feeding the weld filler wire to the weld zone.

13. The method of claim 11, wherein the laser beam is rotatingly projected from the laser weld head by a rotatable mirror.

14. The method of claim 13, wherein the weld filler wire is fed to the weld zone upon rotation of the rotatable mirror.

15. The method of claim 13, wherein the weld wire is fed to the weld zone independently of the rotation of the rotatable mirror.

16. The method of claim 11, further comprising preheating the inner surface of the tube prior to forming the weld zone.

17. The method of claim 16, wherein the preheating is accomplished by rotatingly projecting the laser beam against the inner surface of the tube prior to feeding the weld filler wire to the weld zone.

18. The method of claim 11, wherein the weldment penetrates at least about 50% into the wall of the tube.

19. The method of claim 11, wherein the weldment penetrates from about 60 to about 80% into the wall of the tube.

20. The method of claim 11, wherein the weldment extends less than about 0.03 inch from the inner surface of the tube toward the interior of the tube.

21. The method of claim 11, wherein the small-diameter tube is a nuclear heat exchanger heat transfer tube.

22. The method of claim 11, wherein the laser beam is pulsed and operates at an average power level of less than about 500 watts.

23. The method of claim 11, further comprising:

rotatingly projecting a laser beam from the laser weld head against the inner surface of the tube to preheat a localized portion of the tube prior to forming a weld zone.

24. The method of claim 11, wherein the weld filler wire is mounted on a rotatable spool.

25. A weld head for insertion into a small-diameter tube for laser welding an inner surface of the tube, the weld head comprising:

a housing adapted to be inserted into the tube;

means attached to the housing for spoofing weld filler wire onto the weld head prior to its insertion into the tube;

means for receiving a laser beam into the housing;

means attached to the housing for rotatingly projecting the laser beams against the inner surface of the tube to form a weld zone; and means for feeding the weld filler wire into the weld zone.

* * * * *